United States Patent [19]

Ribble et al.

[11] 4,352,511
[45] Oct. 5, 1982

[54] RELEASABLE CLAMP FOR MODULAR CONNECTOR

[75] Inventors: Franklin Ribble, Arvada; William E. Huber, Englewood, both of Colo.

[73] Assignee: Wilkerson Corporation, Englewood, Colo.

[21] Appl. No.: 234,702

[22] Filed: Feb. 17, 1981

[51] Int. Cl.³ .................................................. F16L 15/00
[52] U.S. Cl. ........................................ 285/91; 285/364; 285/421
[58] Field of Search ................ 285/305, 91, 421, 364; 403/338

[56] References Cited

U.S. PATENT DOCUMENTS

| | | | |
|---|---|---|---|
| 3,718,353 | 2/1973 | Charcharos | 403/338 |
| 3,870,347 | 3/1975 | Houbenestel | 285/421 |
| 4,070,045 | 1/1978 | Colter et al. | 285/325 |
| 4,082,324 | 4/1978 | Obrecht | 285/137 R |
| 4,289,335 | 9/1981 | Olbermann | 285/91 |

*Primary Examiner*—Dave W. Arola
*Attorney, Agent, or Firm*—Ralph F. Crandell

[57] ABSTRACT

A releasable clamp for use with a system for coupling modular pressure fluid components. Each component is formed with a head or body which may contain appropriate conduits and passages. On each side of the body there is provided transversely extending, downwardly tapered flanges which are engaged by correspondingly tapered cam surfaces on the interior surface of depending legs on a clamping yoke. The releasable clamp is formed by a bolt extending between the depending legs of the yoke and mounting a wedge block having a wedging surface which cammingly engages with cooperative wedging surfaces on the fitting components. Upon rotation of the bolt, the wedging surfaces coact to clamp and secure the yoke tightly over the modular components and hold them firmly in pressure-tight relationship.

1 Claim, 4 Drawing Figures

U.S. Patent      Oct. 5, 1982      4,352,511
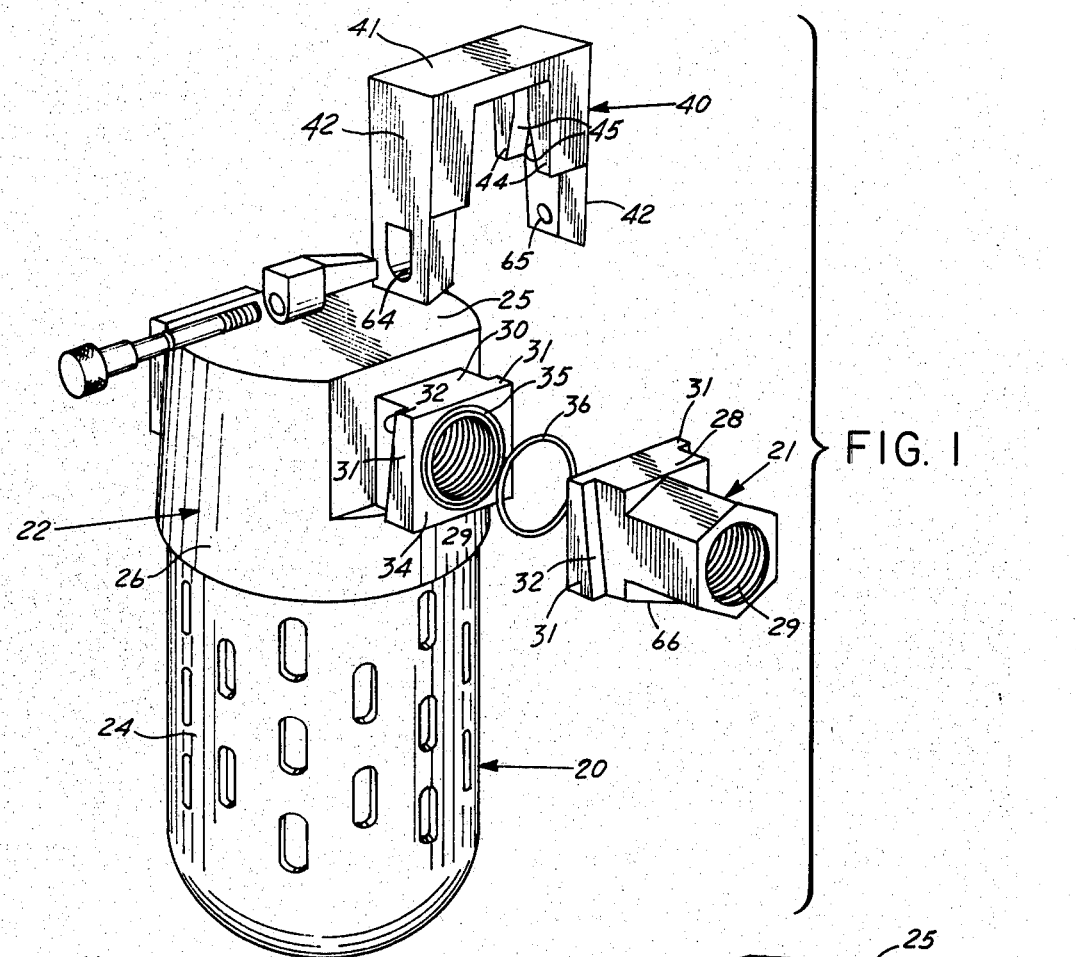
FIG. 1
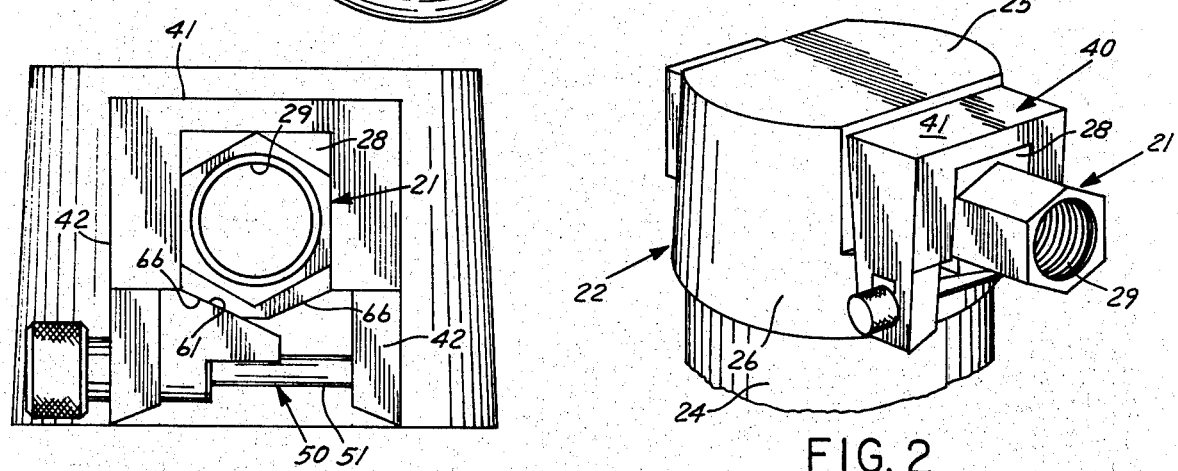
FIG. 3
FIG. 2
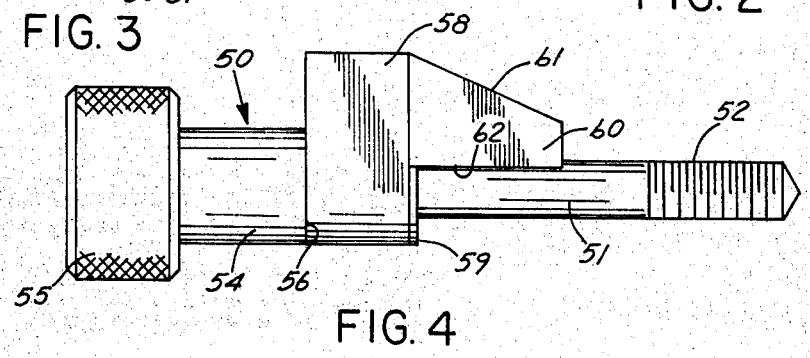
FIG. 4

RELEASABLE CLAMP FOR MODULAR CONNECTOR

BACKGROUND OF THE INVENTION

1. Field of the Invention

The present invention relates to a releasable clamp for use with a system for connecting modular components in a pressure fluid system, and more particularly to a clamping device for releasably securing together two modular pressure fluid line components, such as filters, regulators, lubricators, dryers, drains and the like.

2. Description of the Prior Art

Fluid pressure systems, such as compressed air systems, require the use of a variety of devices such as filters, regulators, lubricators, drains, dryers and the like. These components have conventionally been connected in the system by means of standard threaded piping arrangements. Various improved separable connections have been proposed, such as the separable connection described in U.S. Pat. No. 4,070,045 issued Jan. 24, 1978 to J. S. Colter et al., or the connection arrangement disclosed in U.S. Pat. No. 4,082,324 issued Apr. 4, 1978 to R. E. Obrecht. An improved modular clamping system for pressure fluid components is disclosed in copending application of Joseph M. Olbermann, Ser. No. 111,350, filed Jan. 11, 1980 now U.S. Pat. No. 4,289,335, for "Modular Clamping System for Pressure Fluid Components," the disclosure of which is incorporated by reference herein.

OBJECTS OF THE INVENTION

It is the principal object of the present invention to provide an improved clamp device for securing coupled modular pressure fluid line components.

Another object of the present invention is to provide a simplified clamping device for securing joined modular components in a pressure fluid system.

A further object of the present invention is to provide a clamping device of the foregoing type which is readily engageable and disengageable, and which, when mounted, results in a rigid, tightly secured, fluid-tight assembly.

Other objects and advantages of the present invention will become apparent as the following description proceeds, taken in conjunction with the accompanying drawings.

SUMMARY OF THE INVENTION

In accordance with the foregoing objects, the present invention is embodied in a modular component coupling system of the type disclosed in Olbermann application Ser. No. 111,350, in which each component, such as a filter, regulator, lubricator, drier, drain, manifold, union, or the like, includes a body having a conduit therethrough opening at either end through a port into a sealing surface, and having means adjacent the sealing surface for clamping engagement with a clamping yoke. Alternate ones of the sealing surfaces may include an appropriate groove and retained O-ring to provide a seal when two such surfaces are clamped in juxtaposed fluid-tight relationship. In order to provide for coupling engagement, each body is formed with transversely extending tapered flanges extending from either side of the sealing surface. The tapered flanges on two adjoining units are engaged by a yoke having downwardly depending legs bearing cam surfaces on their interior surfaces corresponding cooperatively to the tapered flanges. As the yoke is engaged over the aligned component units to be clamped, the units are tightly pulled together with their abutting sealing faces in tightly sealed relationship to each other.

In accordance with the present invention, an improved clamping device is provided for tightly securing the yoke in place to hold the abutting fittings tightly together in pressure tight relationship. The improved clamping device comprises a bolt threadably mounted in and extending between the lower ends of the depending legs of the yoke. The bolt carries a wedge or cam block having an upwardly directed sloping cam surface adapted for camming engagement with cooperatively tapered downwardly facing wedging surfaces on the abutting fittings. As the bolt is turned, the wedge block moves transversely of the fittings with the corresponding cooperative wedge or cam surfaces of the block and the fittings in friction engagement. As a result, the yoke is pulled downwardly relative to the fittings, thereby tightly squeezing the fittings together. Upon reversal of the bolt rotation, the wedge surfaces separate to release the yoke form the fittings. The wedge block is slidingly retained in a corresponding aperture in one depending yoke leg in order to restrain the block against rotation with the bolt.

DESCRIPTION OF THE DRAWINGS

FIG. 1 is an exploded isometric view of a modular clamping system embodying the present invention.

FIG. 2 is an assembled isometric view of a modular clamping system embodying the present invention.

FIG. 3 is an elevation view showing the yoke and clamping screw in assembled relationship with a fitting.

FIG. 4 is an enlarged elevation view of a clamping screw and wedge block embodied in the present invention.

DESCRIPTION OF THE PREFERRED EMBODIMENT

A modular clamping system embodying the present invention for releasably coupling pressure fluid system components in fluid-tight relationship is shown in the accompanying drawings. As illustrated, the clamping system is utilized to connect a pressure fluid line component 20 which may be, for example, a filter, regulator, lubricator, drain, dryer or the like, to a union or manifold 21, or other similar component. Various permutations and combinations of units may be connected by utilizing the present invention, and the two elements shown are for purposes of illustration only. The modular coupling system is described in more detail in application Ser. No. 111,350, now U.S. Pat. No. 4,289,335, the disclosure of which is incorporated herein by reference.

The pressure fluid line component 20 includes a head 22 to which is mounted a container and guard 24 enclosing a pressure fluid component such as a filter, lubricator, drain or the like (not shown). The head includes a body 25 formed with a depending skirt 26 to which the container and guard 24 are mounted. Likewise, the union or manifold 21 is formed with a body 28. Both the component body 25 and manifold or union body 28 define a conduit or passage having appropriate ports 29 at either end thereof. The union or manifold 21 may have two or more ports, and may be formed as a "T", "Y" or the like. The ports 29 may be interiorly threaded to provide for connection of the various components by means of threaded pipes as an alternative to the improved connection embodying the present invention. The bodies may be symmetrical, with each end being essentially a mirror image of the other, in order that various components, manifolds and the like may be serially connected.

In order to connect two fitting bodies together, each body is defined with a coupling section formed by a reduced end portion 30, through one end of which a passage 29 opens. On either lateral side of the passage 29, the reduced end section 30 is provided with a tapered flange 31. In the configuration shown in the drawings, the flanges 31 taper from a relatively narrow portion at the top to a wider portion at the bottom, thereby defining a sloping shoulder or cam surface 32 directed oppositely from the passage opening 29. On each end of the body, the cam surfaces on each flange 31 are parallel and coplanar. The face 34 of the flanged end portion through which the passage 29 opens defines a sealing surface and may be provided with an appropriate groove 35 surrounding the passage for containing an O-ring 36. Generally, one end surface 34 of a component or manifold body is provided with an O-ring seal while the opposite surface does not contain such a seal. In this way, when two surfaces 34 on adjacent components are placed together, a single O-ring seal 36 is provided between them.

For holding two components together when their corresponding end surfaces 34 are juxtaposed with the passages 29 in alignment, a yoke 40 is provided for engaging the tapered cam surfaces or shoulders 32 to pull and seal the components together. The yoke 40 is formed by a top web portion 41 with depending legs 42 spaced apart sufficiently to straddle the juxtaposed end portions 30 of the abutting connector bodies 25, 28. For engaging the tapered shoulders 32 and drawing the bodies tightly together, each leg 42 is provided on its internal surface with a pair of spaced shoulders 44 defining correspondingly tapered cam surfaces 45. As the yoke 40 is dropped over the juxtaposed connector bodies, the yoke shoulders 45 cammingly engage the body shoulders 32 thereby to draw the bodies tightly together with their abutting surfaces 34 and seal 36 in snug sealing engagement. As the yoke is forced tightly down over the connectors, the respective cam surfaces 32, 45 are firmly engaged with each other.

In order to clamp the yoke 40 tightly in place and thereby securely engage the fitting components 21, 22 in sealed relationship, the present invention is embodied in an improved clamping assembly 50. As shown in the drawing, the clamping assembly 50 is formed by a bolt and wedge device mounted on the yoke 40 at the lower ends of the depending legs 42 and wedgingly engageable with the fitting components 21, 22. As the bolt assembly 50 is rotated, the yoke is pulled downwardly tightly over the adjacent juxtaposed fitting components.

The wedge bolt assembly 50 is formed by a bolt 51 having a threaded end 52 and a knob end 54 with an enlarged knurled thumb knob 55. The knob end 54 defines a shoulder 56 directed towards the threaded end 52. Intermediate its ends the bolt 51 carries a wedge block 58 rotatably mounted thereon adjacent the shoulder 56 and retained by a snap ring 59, engaged in an appropriate groove (not shown) in the bolt 51. The wedge block 58 defines a tapered nose or projection 60 having an upper tapered surface 61. The nose 60 further defines a concave bottom channel 62 adapted to receive and ride on the bolt 51 for supporting the wedge block.

The wedge bolt assembly is releasably engaged with the yoke 40 which is provided in one depending leg 42 with an aperture 64 shaped to receive and guide the wedge block 58 and in the other leg with an internally threaded hole 65 for threaded engagement with the threaded end 52 of the bolt 51. With this construction, as the bolt 51 is threaded into the yoke 40, the wedge block 58 and hence the wedge surface 61 moves forward or back within the space defined between the yoke legs 52, depending upon the direction of rotation of the bolt.

In order to clamp the yoke 40 to the fittings 21, 22, the yoke and fittings are assembled as described above with the yoke legs depending on either side of the fittings. The wedge bolt assembly 50 is then inserted in place and the bolt threadably engaged with the yoke leg. The fittings 21, 22 are provided with downwardly fitting wedge or tapered surfaces 66 complementary with the wedge surface 61 of the wedge block 58, depending upon the orientation of the yoke. As the thumb screw is rotated, the wedge block 58 is traversed between the legs of the yoke, thereby moving the wedge surface 61 in a direction to wedge against the correspondingly tapered surface 66 on the fitting components and thereby draw the yoke tightly downwardly over the flanged ends of the connector fitting blocks. This action holds the fitting blocks tightly together in tightly pressure fluid-tight sealed relationship. The wedge block 58 is guided by the walls of the aperture 64 and is thereby prevented from rotating or twisting away from the camming position.

The assembly is readily released by simply reversing the direction of rotation of the bolt which in turn separates the wedging surfaces 61, 66 respectively. The wedge block bolt assembly 50 is completely removed from the yoke, which may then be lifted off of the fitting assembly and the fitting components separated.

The yoke and wedge block assembly is symmetrical and, for this reason, may be mounted on assembled fitting components from either side, depending upon available access. Because of the thickness of the wedge block, the depending legs of the yoke are desirably trapezoidal in cross-section to provide an increased width and, at the same time, provide for a smoothly contoured, assembled fitting.

While one illustrative form of the present invention has been shown in the drawings and described above in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

What is claimed is:

1. A clamping structure for releasably securing together two pressure fluid conducting components in sealed relationship, each component having means thereon defining a sealing surface including a pressure fluid port therein and adapted for juxtaposed sealing engagement with a corresponding sealing surface on the other component, transversely extending flanges adjacent each of said sealing surfaces and defining on each component coplanar cam surfaces sloping away from the adjacent sealing surface, means defining a wedge surface on at least of one of said components below and generally transverse to said sloping cam surfaces, a yoke having spaced parallel depending legs, means on said legs defining opposed sloping cam surfaces engageable with said flanges when said component sealing surfaces are positioned together for clamping said components together in sealed pressure fluid conducting engagement, said yoke legs having aligned apertures extending therethrough, one of said apertures being threaded, a bolt positioned in said apertures and extending between said yoke legs and having a threaded end threadably engaged with said threaded aperture and having a headed end defining a head exterior of the other leg and abutment means intermediate said threaded end and said headed end, and a wedge rotatably carried by said bolt intermediate the ends thereof and adapted for sliding engagement with the aperture in the other leg, said wedge having a wedge surface adapted to engage said wedge surface of said component and an abutment surface to engage said abutment means when said components are juxtaposed and said bolt is threaded into said threaded aperture thereby to pull said yoke tightly over said components to releasably clamp and retain said components tightly together in fluid pressure tight relation.

* * * * *